United States Patent
Olesiewicz et al.

(10) Patent No.: US 8,000,109 B2
(45) Date of Patent: Aug. 16, 2011

(54) NON-POSITIONAL HIGH-LOAD SECURING METHOD FOR MEZZANINE BOARD ASSEMBLIES

(75) Inventors: Timothy W. Olesiewicz, Santa Clara, CA (US); Robert S. Antonuccio, Burlington, MA (US); Brett C. Ong, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 697 days.

(21) Appl. No.: 12/122,816

(22) Filed: May 19, 2008

(65) Prior Publication Data

US 2009/0284914 A1 Nov. 19, 2009

(51) Int. Cl.
H05K 7/14 (2006.01)
H05K 7/18 (2006.01)

(52) U.S. Cl. ........................................ 361/801; 248/560

(58) Field of Classification Search ................... 361/807, 361/809, 810, 748, 767, 774, 679.57, 801; 248/560, 682, 200, 214, 218.11
See application file for complete search history.

(56) References Cited

U.S. PATENT DOCUMENTS

| | | | | |
|---|---|---|---|---|
| 4,504,886 A * | 3/1985 | Cygan et al. | ................... | 361/721 |
| 5,168,872 A * | 12/1992 | Rasmussen et al. | ........... | 248/560 |
| 5,742,487 A * | 4/1998 | Kobayashi et al. | ............ | 361/809 |
| 5,913,499 A * | 6/1999 | Kiggins | ........................ | 248/200 |
| 6,049,451 A * | 4/2000 | Schmitt et al. | ............ | 361/679.33 |
| 6,290,194 B1 * | 9/2001 | Chaconas et al. | ............. | 248/214 |
| 6,512,678 B2 * | 1/2003 | Sims et al. | ..................... | 361/759 |
| 6,644,611 B1 * | 11/2003 | Tai | ............................ | 248/292.13 |
| 6,667,874 B2 * | 12/2003 | Chiang | ........................ | 361/213 |
| 6,960,720 B2 * | 11/2005 | Wen-Lung | ....................... | 174/50 |
| 7,158,385 B1 * | 1/2007 | Wang | .............................. | 361/759 |
| 7,200,011 B2 * | 4/2007 | Fronk | ............................ | 361/810 |
| 7,443,694 B1 * | 10/2008 | Chen et al. | ..................... | 361/801 |
| 2001/0040795 A1 * | 11/2001 | Mccutchan et al. | .......... | 361/752 |
| 2002/0030976 A1 * | 3/2002 | Boe | ................................ | 361/752 |
| 2004/0246682 A1 * | 12/2004 | Osakada et al. | .............. | 361/709 |
| 2006/0002067 A1 * | 1/2006 | Gunderson et al. | ........... | 361/683 |
| 2006/0171134 A1 * | 8/2006 | Tsai | ............................... | 361/807 |
| 2007/0291460 A1 * | 12/2007 | Chu | ............................... | 361/801 |
| 2008/0108248 A1 * | 5/2008 | Lim et al. | ...................... | 439/532 |
| 2008/0165486 A1 * | 7/2008 | Chen et al. | ..................... | 361/683 |
| 2008/0298028 A1 * | 12/2008 | Travers | ......................... | 361/748 |

* cited by examiner

Primary Examiner — Lisa Lea-Edmonds
Assistant Examiner — Xanthia Cunningham
(74) Attorney, Agent, or Firm — Osha • Liang LLP

(57) ABSTRACT

A bracket device for securing a mezzanine board assembly includes a brace including a rigid bar and a plurality of connector portions connected to the bar. Each of the plurality of connector portions has a hole. A plurality of pins each configured to respectively pass through the hole in each of the plurality of connector portions and engage an attachment part of the mezzanine board assembly. The bracket device also includes a plurality of mounting brackets movably attached to the plurality of connector portions, each having a guide configured to engage a holder for the mezzanine board assembly. A method for securing a mezzanine board assembly includes inserting a pin into a hole at a connector portion of a brace and movably attaching a mounting bracket to the connector portion. The pin passes through an opening of the connector portion. The method also includes installing a guide of the mezzanine board assembly to a holder for the mezzanine board assembly, engaging a pin with attachment part of the mezzanine board assembly, and extracting the mezzanine board assembly using a bar of the brace.

20 Claims, 8 Drawing Sheets

NON-POSITIONAL HIGH-LOAD SECURING METHOD FOR MEZZANINE BOARD ASSEMBLIES

BACKGROUND

FIG. 1 shows a perspective view of a typical computer where a top cover (not shown) of a chassis is removed. As can be seen in FIG. 1, various kinds of electronic parts 102 are disposed on a main board 103 of the computer 100. The main board 103 is disposed on a bottom surface of the chassis 101 via supports 105.

FIG. 2 shows a perspective view of the computer in FIG. 1 where a mezzanine board assembly is installed. As shown in FIG. 2, the mezzanine board assembly 201 supports a mezzanine board having various kinds of electronic parts 202. Mezzanine boards are used to add computing power and memory density to the computer. Thus, mezzanine assemblies are often included and, for ease of installation, mezzanine board assemblies are typically secured to the chassis via latches (not shown).

SUMMARY OF INVENTION

One or more embodiments of the present invention relate to a bracket device for securing a mezzanine board assembly, comprising: a brace comprising: a rigid bar, and a plurality of connector portions connected to the bar, wherein each of the plurality of connector portions has a hole, a plurality of pins each configured to respectively pass through the hole in each of the plurality of connector portions and engage an attachment part of the mezzanine board assembly; and a plurality of mounting brackets movably attached to the plurality of connector portions each having a guide configured to engage a holder for the mezzanine board assembly.

One or more embodiments of the present invention relate to a method for securing a mezzanine board assembly, comprising: inserting a pin to a hole at a connector portion of a brace; movably attaching a mounting bracket to the connector portion, wherein the pin passes through an opening of the connector portion; installing a guide of the mezzanine board assembly to a holder for the mezzanine board assembly; engaging a pin with attachment part of the mezzanine board assembly; and extracting the mezzanine board assembly using a bar of the brace.

Other aspects and advantageous of the invention will be apparent from the following description and appended claims.

DETAILED DESCRIPTION

Figure 1:
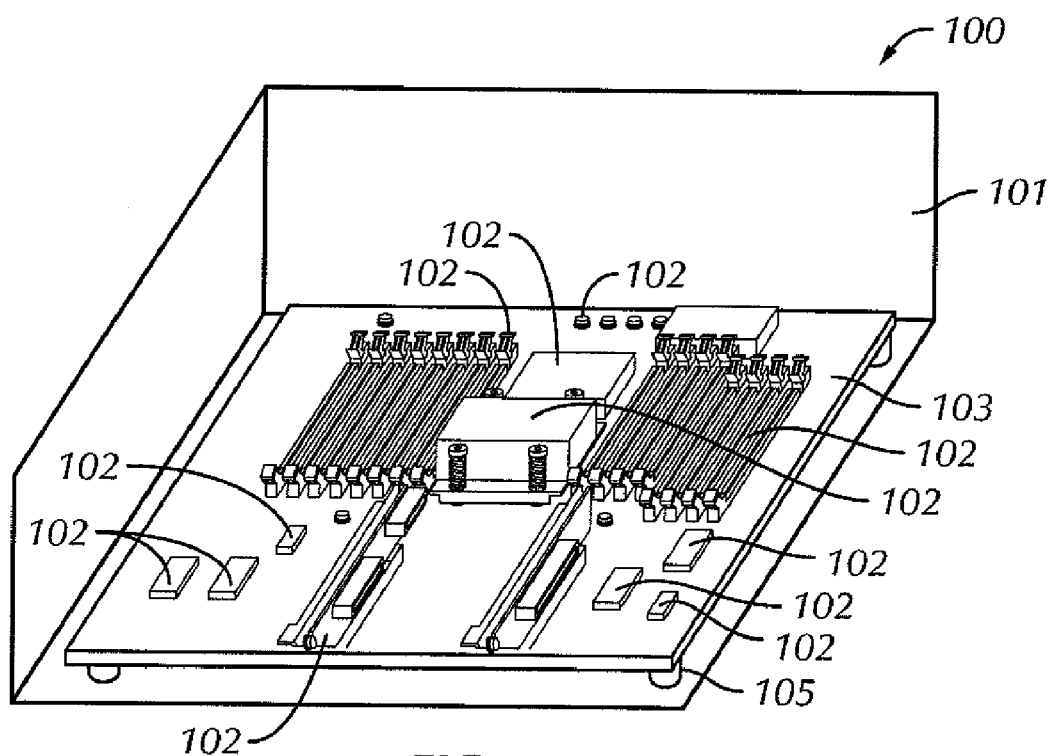
FIG. 1 shows a perspective view of a typical computer where a top cover of a chassis is removed.
Figure 2:
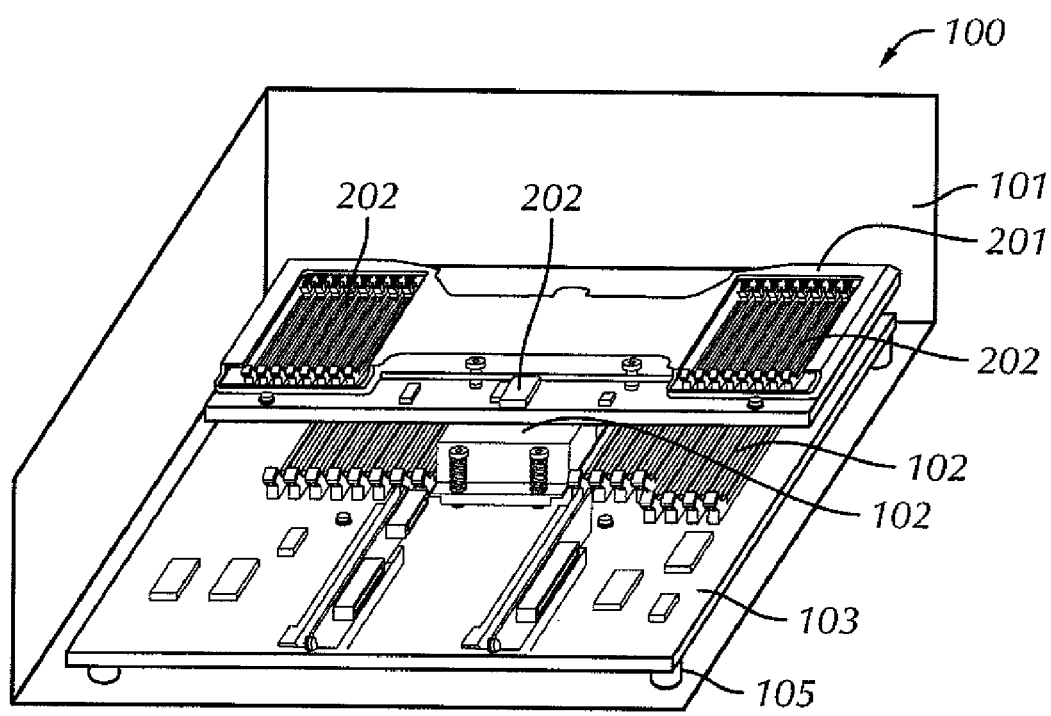
FIG. 2 shows a perspective view of the computer in FIG. 1 where a mezzanine board assembly is installed.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, latches are used to secure a mezzanine board assembly to the chassis of a computer. However, the weight of the mezzanine board assembly together with shock experienced during shipping and installation may exceed the strength of these latches. Accordingly, one or more embodiments of the present invention relate to a non-positional, high-load support bracket for securing mezzanine board assemblies.

Figure 3:
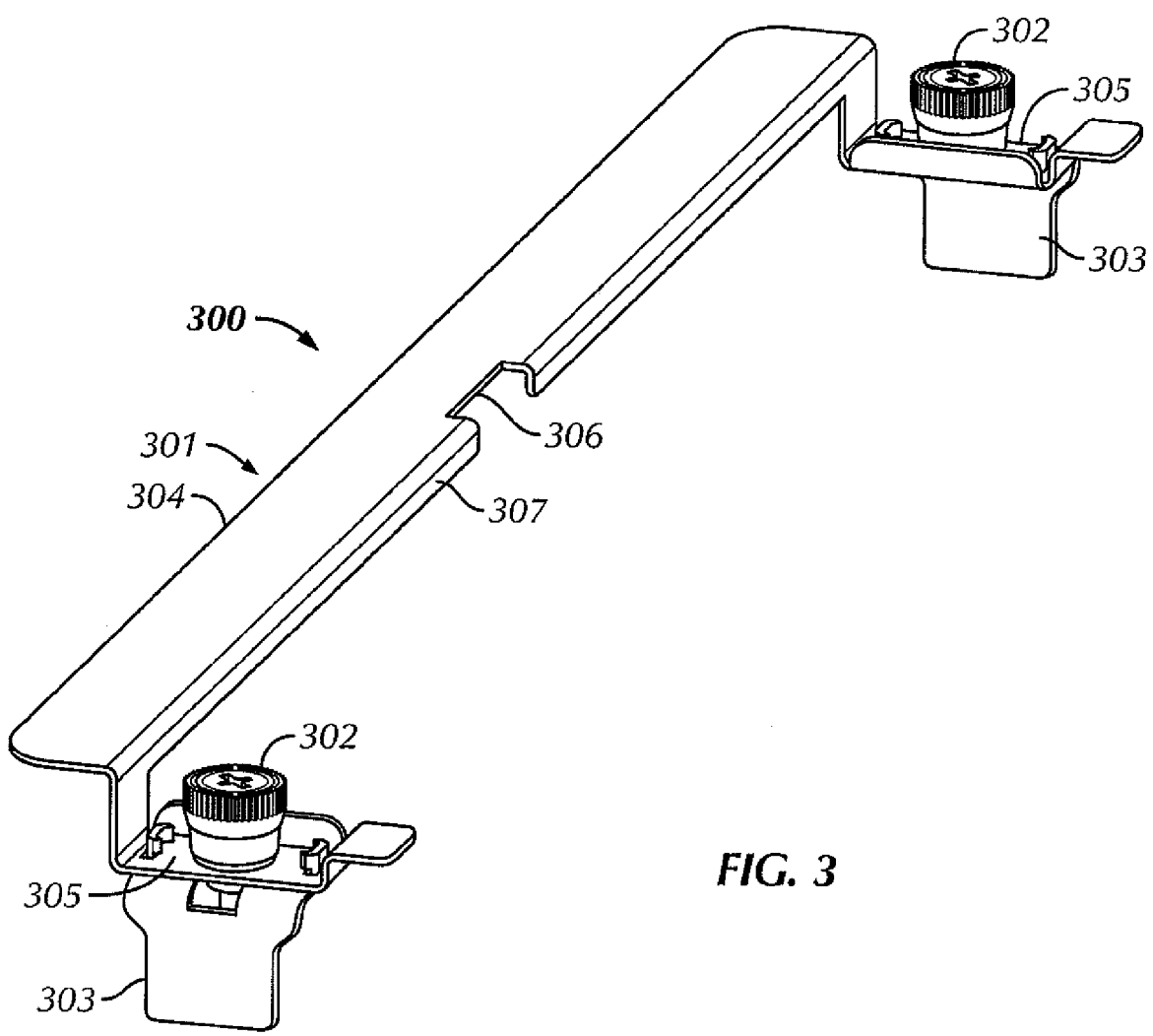
FIG. 3 shows a perspective view of a bracket device for securing a mezzanine board assembly.

FIG. 3 shows a perspective view of a bracket device for securing a mezzanine board assembly. As shown in FIG. 3, the bracket device 300 has a brace 301, two pins 302, and two mounting brackets 303. The brace 301 has a bar 304 and two connector portions 305 that are laterally connected to the bar 303 at both ends thereof. The bar 304 and two connector portions 305 may be integral. The bracket device 300 may be made of a rigid material such as iron, stainless steel, or any other suitable material known in the art.

The bar 304 is a thin rectangular plane in shape, and the length of the bar 304 in the longitudinal direction is approximately the same as a width of a mezzanine board assembly (not shown) to which the bracket device 300 is installed. The bar 304 is rigid enough to carry the mezzanine board assembly (not shown) after the bracket device 300 is installed to.

A longitudinal edge 307 of the bar 304 may be bent to provide more strength to the bar 304 in this embodiment. One skilled in the art will appreciate that one or both longitudinal edges of the bar 304 are bent downwardly or upwardly. Also, one skilled in the art will appreciate that different shapes of the bar 304 could be used in accordance with the design of a computer or a server (not shown) to which the bracket device 300 is installed to as long as the bar 304 is rigid enough to carry the mezzanine board assembly (not shown) and the bracket device 300 does not impact an air flow of the computer or server (not shown) substantially when the mezzanine board assembly (not shown) is left in the computer or server (not shown) as explained in details below. In addition, the bar 304 may have a concave portion 306 around the middle thereof.

Figure 4:
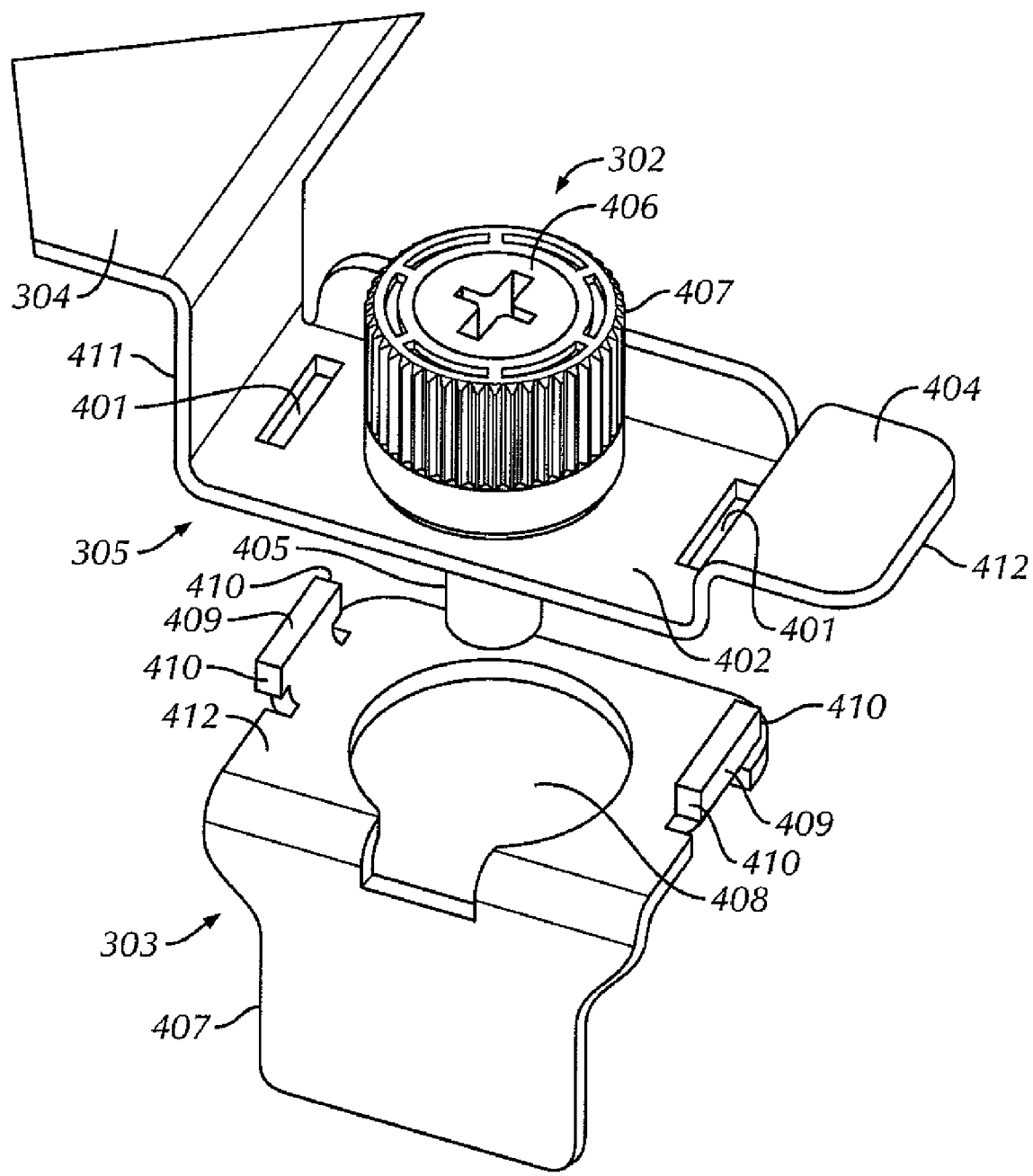
FIG. 4 shows an enlarged view of the bracket device before the mounting bracket is installed to the connector portion of the brace.

FIG. 4 shows an enlarged view of the bracket device before the mounting bracket is installed to the connector portion of the brace. As shown in FIG. 4, the connector portion 305 is laterally connected to the end of the bar 304. Specifically, the connector portion 305 has a plane portion 402, and one edge 411 of the plane portion 402 may be bent approximately perpendicular to the plane portion 402 so as to integrally connect the connector portion 305 to the bar 304.

Further, an edge 403 of the plane portion 402, which is perpendicular to the end 411 of the plane portion 402 that the bar 304 is connected to, may be bent approximately perpendicular to the plane portion 402 so that the connector portion 305 is more rigid. The other edge of the plane portion 402 may also be bent in the same way. Further, an edge 412 of the plane portion 402, which is parallel to the plane portion 402 that the bar 304 is connected to, may be bent twice so that the connector portion 404 may have a projected portion 404 that are approximately parallel to the plane portion 402 and the bar 304.

The pin 302 has a threaded portion 405 and a thumb screw 406. The thumb screw 406 may have a cylindrical top portion having an indentation 407 such that the pin 302 is able to be fastened without using a driver (not shown). Although FIG. 4 shows that the pin 302 has the thumb screw 406 and the cylindrical top portion having an indentation 407, one skilled in the art will appreciate that the pin 302 has either thumb screw 406 or an indentation 407. Also, one skilled in the art will appreciate that a different shape of a top portion of the pin 302 could be used as long as the pin 302 is fastened using the top portion.

The plane portion 402 of the connector portion 305 has a hole (not shown) at the center thereof and two rectangular openings 401 at both sides of the pin 302. The diameter of the hole (not shown) is approximately the same as the diameter of the threaded portion 405 of the pin 302 such that the pin 302 passes through the hole (not shown). On the other hand, the diameter of the thumb screw 406 is wider than the diameter of the hole (not shown). Therefore, the thumb screw 406 is rotatably disposed on the top surface of the plane portion 402 when the threaded portion 405 of the pin 302 is inserted into the hole (not shown).

The mounting bracket 303 has a mounting portion 412 and a guide 407. The guide 407 is connected to the mounting portion 412 approximately perpendicular to the mounting portion 412. The mounting portion 412 may be integral with the guide 407. The size of the mounting portion 412 is approximately the same as the plane portion 402 of the connector portion 305. Thus, the mounting portion 412 is tangent to the plane portion 402 when the mounting bracket 303 is movably attached to the connector portion 305 of the brace 301 as explained below.

The mounting portion 412 has an opening 408 around the center thereof and two projections 409 at both sides of the opening 408. The diameter of the opening 408 is wider than the diameter of the threaded portion 405 of the pin 302 such that the position of the brace 301 is adjustable relative to the mounting bracket 303 after the mounting bracket 303 is installed to the connector portion 305. The projections 409 are approximately perpendicular to the top surface of the mounting portion 412 and disposed around both ends of the mounting portion 412. Each of the projection 409 has two hooks 410 at both top side ends thereof. The hooks 410 may be integral with the projection 409.

Figure 5:
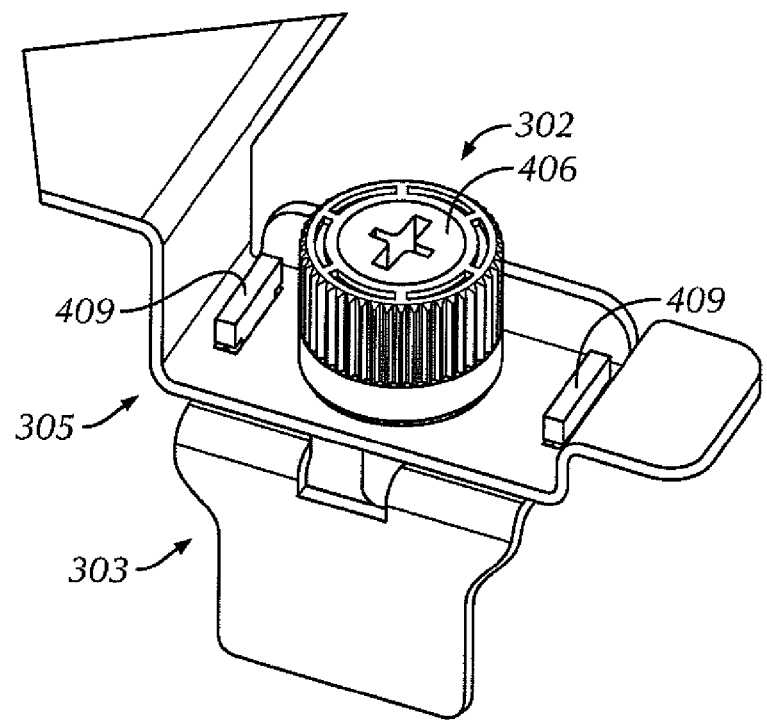
FIG. 5 shows an enlarged view of the bracket device when the projections are fully inserted to the rectangular openings of the connector portions.
Figure 6:
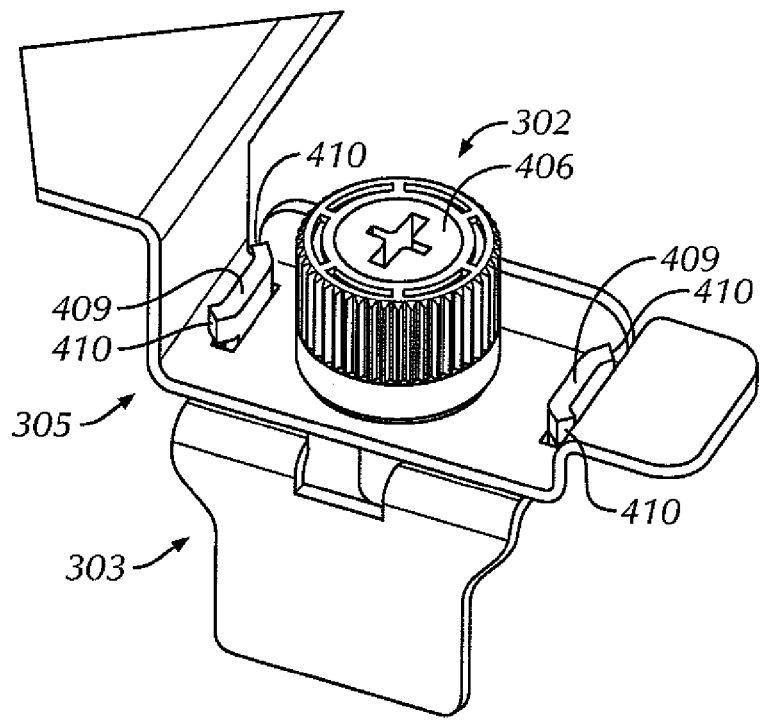
FIG. 6 shows an enlarged view of the bracket device when the projections are fully inserted to the rectangular openings of the connector portions and the hooks are bent.

FIG. 5 shows an enlarged view of the bracket device when the projections are fully inserted to the rectangular openings of the connector portions. FIG. 6 shows an enlarged view of the bracket device when the projections are fully inserted to the rectangular openings of the connector portions and the hooks are bent. As shown in FIG. 5, the projections 409 are inserted to the rectangular openings 401 of the connector portions 305. Then, as shown in FIG. 6, the hooks 410 are bent so that the mounting bracket 303 is movably attached to the bottom surface of the plane portion 402. Specifically, as can be seen from FIGS. 5 and 6, the width and the length of the rectangular opening 401 is wider than those of the projection 409 such that the position of the brace 301 relative to the mounting bracket 303 is adjustable after the mounting bracket 303 is installed to the connector portion 305.

Although the hooks 402 are bent toward the outside of the connector portions 305 in FIG. 6, the hooks 402 may be bent in different directions as long as the mounting bracket 303 is hold by the connector portion 305 as explained above. Also, one skilled in the art will appreciate that different positions and/or numbers of rectangular openings 401 and the projections 409 could be used in accordance with the design and/or the desired strength of the bracket device 300 as long as the mounting bracket 303 is hold movably by the connector portion 305 as explained above. Further, one skilled in the art will appreciate that any other shapes and numbers of the hooks could be used so long as the mounting bracket 303 is movably held by the connector portions 305 as described above.

Figure 7:
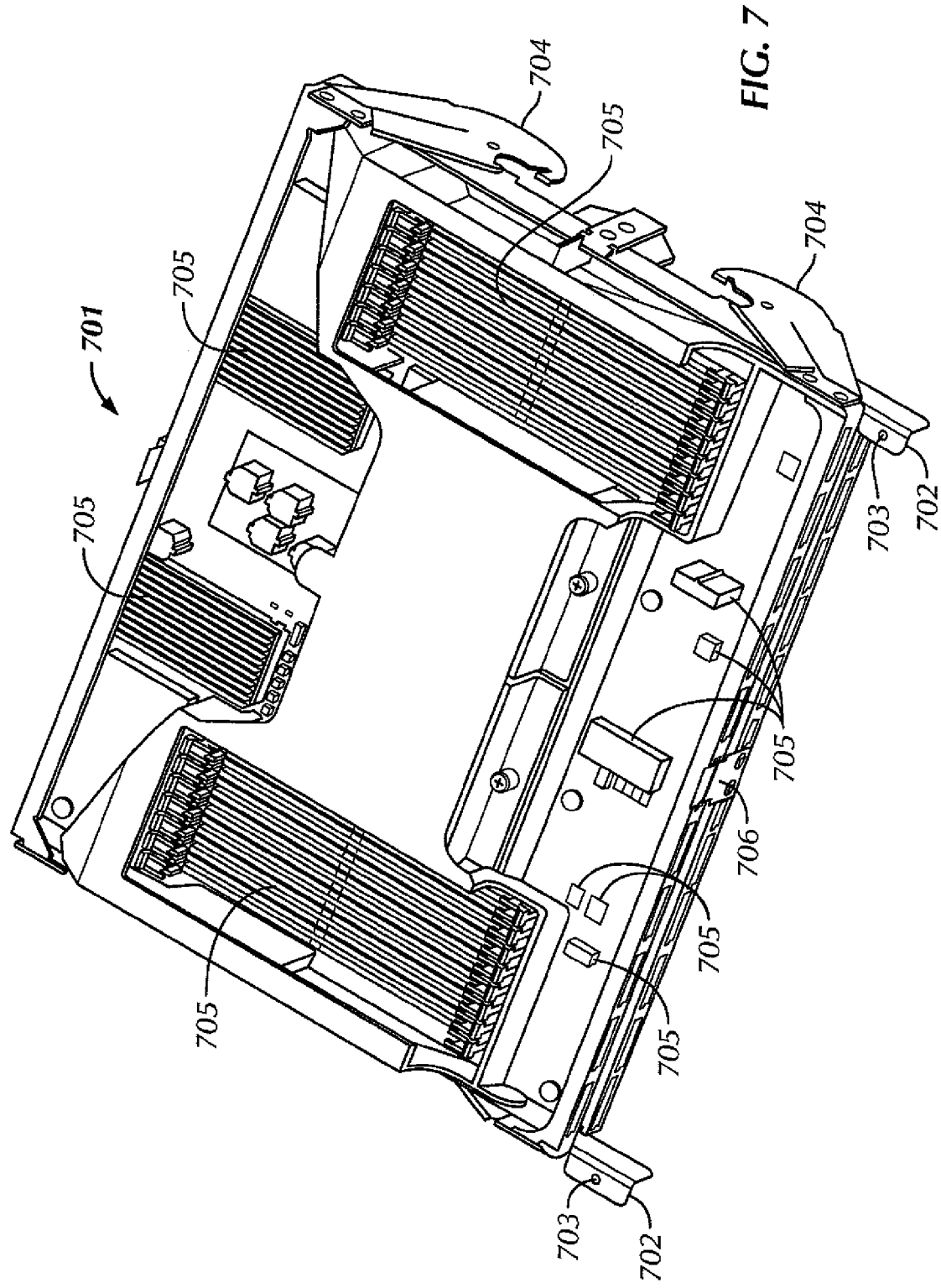
FIG. 7 shows a perspective view of the mezzanine board assembly.

FIG. 7 shows a perspective view of the mezzanine board assembly. As shown in FIG. 7, the mezzanine board assembly 701 has many and various kinds of electronic parts 705 thereon. The mezzanine board assembly 701 has two attachment parts 702 projecting from two corners of the mezzanine board assembly 701. Each of the attachment parts 702 has a threaded hole 703 to engage with the threaded portion 405 of the pin 302. Further, the mezzanine board assembly 701 has supports 704 at the side thereof. The mezzanine board assembly 701 may have a perpendicular panel 706 at the edge thereof and between the attachment parts 702.

Figure 8:
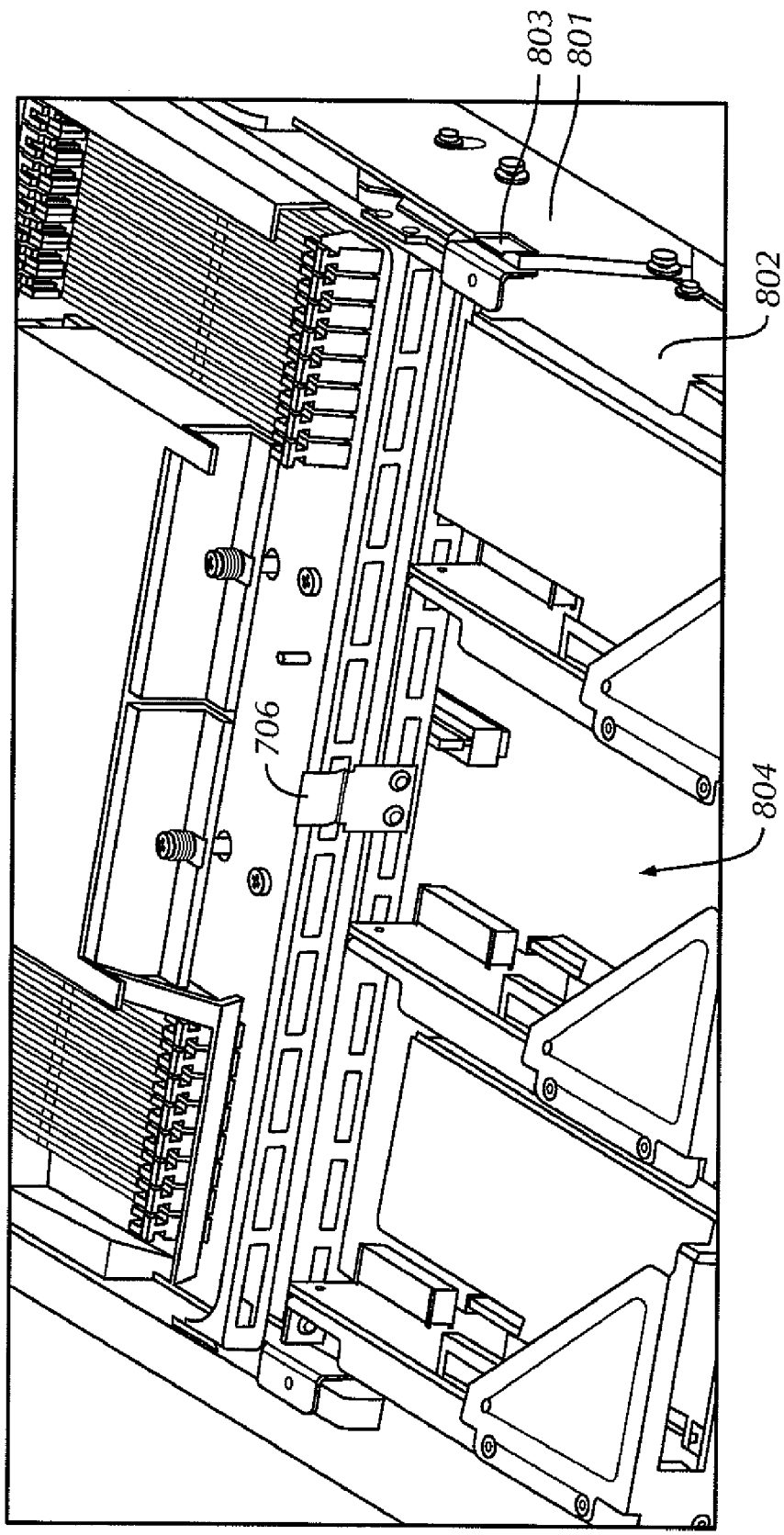
FIG. 8 shows an enlarged perspective view of the mezzanine board assembly where the mezzanine board assembly is installed to a mezzanine board assembly holder before the bracket device is installed.
Figure 9:
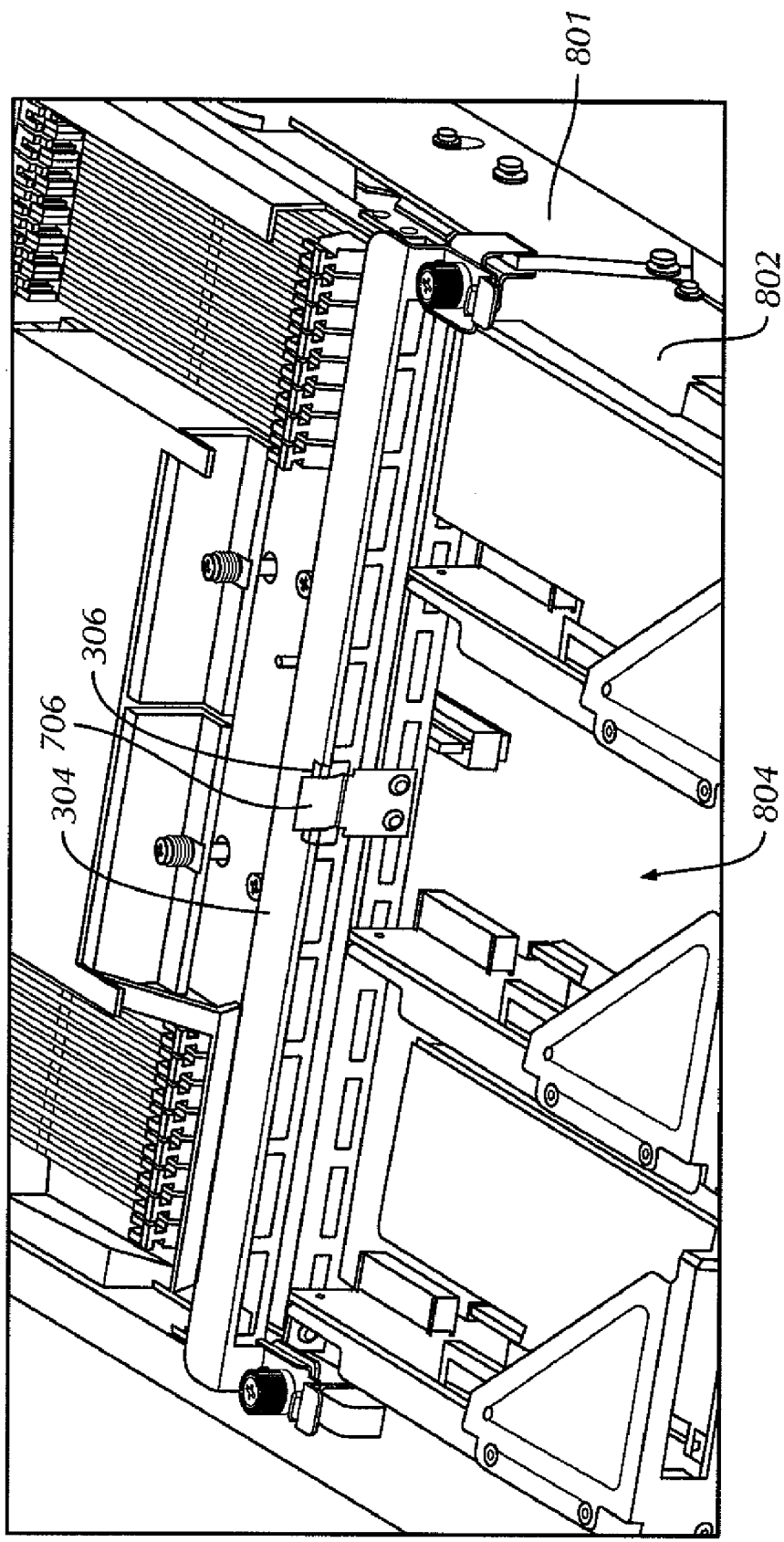
FIG. 9 shows an enlarged perspective view of the mezzanine board assembly where the mezzanine board assembly is installed to a mezzanine board assembly holder after the bracket device is installed.

FIG. 8 shows an enlarged perspective view of the mezzanine board assembly where the mezzanine board assembly is installed to a mezzanine board assembly holder before the bracket device is installed. FIG. 9 shows an enlarged perspective view of the mezzanine board assembly where the mezzanine board assembly is installed to a mezzanine board assembly holder after the bracket device is installed. As shown in FIGS. 8 and 9, the mezzanine board assembly holder 801 is disposed approximately perpendicular to a mother board 802 of a computer or a server 804. The supports 704 of the mezzanine board assembly 701 engage with guides (not shown) provided at the inside surface of the mezzanine board assembly holder 801 so that the mezzanine board assembly 701 is installed to the mezzanine board assembly holder 801. In addition, the mezzanine board assembly holder 801 may be positioned at the side of a chassis (not shown) of the computer or server 804. One skilled in the art will appreciate that any other designs of the guides and supports known in the art to install the mezzanine board assembly 701 to the mezzanine board assembly holder 801.

The mezzanine board assembly holder 801 has a recess 803 at the top end outside surface thereof. The size and the shape of the recess 803 is approximately the same as those of the guide 407 so that the guide 407 is slidably inserted to the recess 803 and tightly held by the recess 803 when the bracket device 300 is installed to the mezzanine board assembly 701. Also, due to the recess 803 and the guide 407, the bracket device 300 is automatically positioned properly while installing the mezzanine board assembly 701. One skilled in the art will appreciate that any other shapes, designs, the positions of the recess 803 and the guide 407 as long as the bracket device 300 is automatically positioned properly while installing the mezzanine board assembly 701 as described above.

Further, as shown in FIG. 9, when the bracket device 300 is installed to the mezzanine board assembly 701 in the computer or server 804, the threaded portion 405 of the pin 302 engages with the threaded hole 703 of the attachment parts 702, and, at the same time, the guide 407 engages with the recess 803. The perpendicular panel 706 may be positioned at the concave portion 306 of the bar 304. Here, because the brace 301 is movably held by the mounting bracket 303 as described above, the threaded portion 405 of the pin 302 engages with the threaded hole 703 of the attachment parts 702 without affecting the alignment of the mezzanine board assembly 701. Also, the mezzanine board assembly 701 is extracted without affecting the alignment of the mezzanine board assembly 701.

In one or more embodiments, the bracket device 300 may be left in the computer or server 804 because, during operation of the computer or server 804, the bracket device 300 does not substantially affect the thermal performance or the air flow within the computer or server 804 due to the design of the bracket device 300 as described above. On the other hand, in one or more embodiments, the bracket device 300 may be removed.

Figure 10:
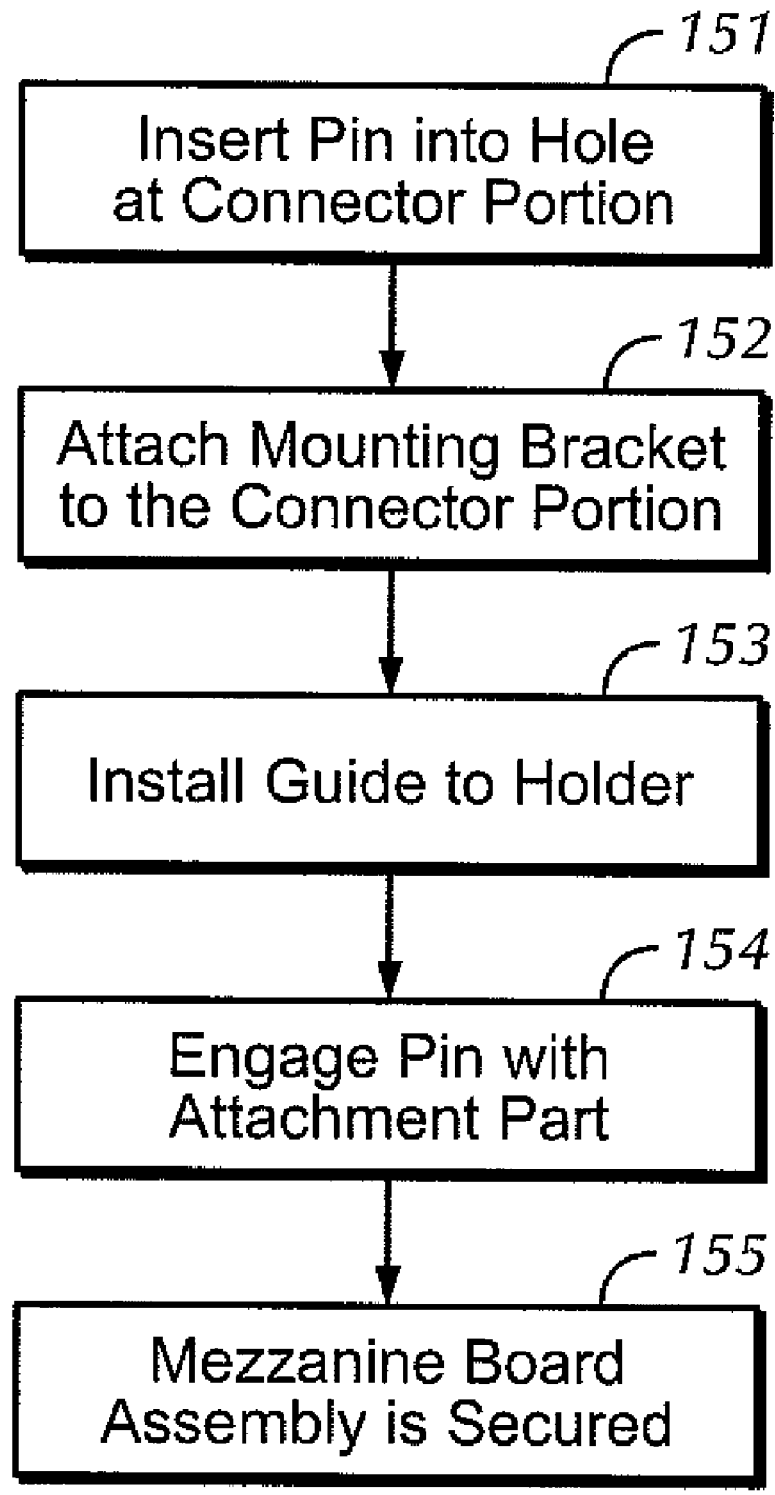
FIG. 10 shows a flow diagram of installing the mezzanine board to the main board.

FIG. 10 shows a flow diagram of installing the bracket device to the mezzanine board assembly. In one or more embodiments of the invention, one or more steps described below may be omitted, repeated, and/or performed in a different order.

First, the threaded portion 405 of the pin 301 is inserted to the hole of the connector portion 305 as shown in FIG. 4 (Step 151). Second, the mounting bracket 303 is attached to the connector portion 305 of the bracket device 300 (Step 152). Specifically, the projection 409 is inserted to the rectangular opening 401 as shown in FIG. 5, and, then, the hook 410 is bent so as to movably attach the mounting bracket 303 to the connector portion 305 as shown in FIG. 6.

Next, the guide 407 of the mounting bracket 303 is installed to the recess 803 of the mezzanine board holder 801 as shown in FIG. 9 (Step 153). At this time, because of the engagement of the recesses 803 and the guide 407, the position of the threaded portions 405 are roughly adjusted relative to the threaded holes 703 of the attachments parts 702. Then, the threaded portion of the pin 302 is engaged with the threaded hole of the pin 702 (Step 154). Specifically, after the position of the bracket device 300 is adjusted to engage the threaded portions 405 of the pins 302 with the threaded holes 703 of the attachment parts 702, the threaded portions 405 of the pins 302 are engaged with the threaded holes 703 of the pins 302. Because the mounting bracket 303 is movably attached to the connecter portions 305, the position of the bracket device 300 is able to be adjusted.

Thus, the mezzanine board assembly is secured and supported within the chassis 304 (Step 155). In addition, after installing the mezzanine board assembly 701, the bracket device 300 may be left in the computer or server 804. When removing the bracket device 300, the above steps are performed in the opposite order.

One or more embodiments of the present invention may have one or more of the following advantages. The bracket device 300 provides an additional strength and retention to the mezzanine board assembly 701 during the shipment and the transport of the mezzanine board assembly 701. That is, the bracket device 300 prevents a mechanism of the mezzanine board assembly 701 from coming loose. Further, the bracket device 300 does not substantially impact the air flow of the computer or the server 804 if the bracket device 300 is left in the computer or server 804.

The bracket device 300 can be removed from the mezzanine board assembly 701 before the mezzanine board assembly 701 is removed from the computer or the server 804. Also, the bracket device 300 can be installed to the mezzanine board assembly 701 after the mezzanine board 701 is installed to the computer or the server 804. Thus, the bracket device 300 and the process for installing the bracket device 300 are simple.

Further, because the bracket device 300 is non-positional in that the mounting brackets 303 is movably attached to the brace 301, the bracket device 300 provides secure retention of the mezzanine board assembly 701 without affecting the precise alignment of the mezzanine board assembly 701.

While the invention has been described with respect to a limited number of embodiments, those skilled in the art, having benefit of this disclosure, will appreciate that other embodiments can be advised which do not depart from the scope of the invention as disclosed therein. Accordingly, the scope of the invention should be limited only by the attached claims.

What is claimed is:

1. A bracket device for securing a mezzanine board assembly, comprising:
   a brace comprising:
      a rigid bar, and
      a plurality of connector portions connected to the bar, wherein each of the plurality of connector portions has a hole,
   a plurality of pins each configured to respectively pass through the hole in each of the plurality of connector portions and engage an attachment part of the mezzanine board assembly; and
   a plurality of mounting brackets movably attached to the plurality of connector portions each having a guide configured to engage a holder for the mezzanine board assembly.

2. The bracket device for securing a mezzanine board assembly of claim 1, wherein the plurality of mounting brackets each has an opening, and
   wherein the plurality of pins each passes through the opening.

3. The bracket device for securing a mezzanine board assembly of claim 2, wherein a diameter of the opening is wider than a diameter of the hole such that a plurality of mounting brackets movably attached to the plurality of connector portions.

4. The bracket device for securing a mezzanine board assembly of claim 1, wherein the plurality of connector portions each further comprises a rectangular opening, and
   wherein the plurality of mounting brackets each further comprises a projected portion configured to pass through the rectangular opening.

5. The bracket device for securing a mezzanine board assembly of claim 4, wherein a length and a width of the rectangular opening is wider than a length and a width of the projected portion such that the plurality of mounting brackets movably attached to the plurality of connector portions.

6. The bracket device for securing a mezzanine board assembly of claim 4, wherein the projected portion further comprises a hook so as to movably hold the mounting bracket to the connector portion.

7. The bracket device for securing a mezzanine board assembly of claim 1, wherein the plurality of pins each comprises:
   a threaded portion passing through the hole and the opening; and
   a screw top.

8. The bracket device for securing a mezzanine board assembly of claim 1, wherein the plurality of pins each comprises:
 a threaded portion passing through the hole and the opening; and
 a cylindrical top portion having an indentation.

9. The bracket device for securing a mezzanine board assembly of claim 1, wherein a longitudinal length of the brace is approximately the same as a width of the mezzanine board assembly.

10. The bracket device for securing a mezzanine board assembly of claim 1, wherein the plurality connector portions are laterally connected to the bar at both ends of the rigid bar.

11. The bracket device for securing a mezzanine board assembly of claim 1, wherein the rigid bar has a concave portion near a middle thereof.

12. The bracket device for securing a mezzanine board assembly of claim 1, wherein the holder for the mezzanine board assembly is installed on a main board.

13. The bracket device for securing a mezzanine board assembly of claim 1, wherein a longitudinal edge of the rigid bar is bent.

14. The bracket device for securing a mezzanine board assembly of claim 1, wherein a mounting portion of the mounting bracket is tangent to a bottom surface of the connector portion when the mounting bracket is installed to the connector portion.

15. The bracket device for securing a mezzanine board assembly of claim 1, wherein the attachment part of the mezzanine board has a threaded hole, and wherein each of the plurality of the pins engages with the threaded hole.

16. The bracket device for securing a mezzanine board assembly of claim 1, wherein an edge of the connector portion is bent.

17. A method for securing a mezzanine board assembly, comprising:
 inserting a pin to a hole at a connector portion of a brace;
 movably attaching a mounting bracket to the connector portion, wherein the pin passes through an opening of the connector portion;
 installing a guide of the mezzanine board assembly to a holder for the mezzanine board assembly; and
 engaging a pin with attachment part of the mezzanine board assembly.

18. The method for securing a mezzanine board assembly of claim 17, further comprising inserting a projected portion to a rectangular opening of the connector portion.

19. The method for securing a mezzanine board assembly of claim 18, further comprising bending a tip portion of the projected portion such that the projected portion is movably attached to a rectangular opening of the connector portion.

20. The method for securing a mezzanine board assembly of claim 18, further comprising adjusting a position of the mezzanine board assembly relative to the mounting bracket.

* * * * *